United States Patent [19]
McCullough

[11] 3,815,985
[45] June 11, 1974

[54] MAGNETIC TAPE PROGRAMMING SYSTEM FOR CONTROLLING MULTIPLE ELECTRICAL APPLIANCES

[76] Inventor: Charles E. McCullough, 5408 Pendleton Ln., Austin, Tex. 78723

[22] Filed: May 30, 1972

[21] Appl. No.: 257,784

[52] U.S. Cl. .................................................. 353/15
[51] Int. Cl. .......................................... G03b 31/06
[58] Field of Search ................................ 353/15–19

[56] References Cited

UNITED STATES PATENTS

| | | | |
|---|---|---|---|
| 3,447,864 | 6/1969 | Shadley | 353/15 |
| 3,480,738 | 11/1969 | Meyer | 353/15 |

FOREIGN PATENTS OR APPLICATIONS

| | | | |
|---|---|---|---|
| 1,224,531 | 9/1966 | Germany | 353/15 |

*Primary Examiner*—Samuel B. Rothberg
*Assistant Examiner*—A. Jason Mirabito

[57] ABSTRACT

A magnetic tape programming system for controlling multiple slide projectors comprises a multiple track magnetic tape player, at least one audio high-fidelity amplifying circuit for recording and/or replaying audio information from at least one channel of the tape recorder, a tape head for pickup and recording of projector cue signals from another one of the channels of the tape recorder, a record amplifier, a tape replay preamplifier, and a switch for alternately switching the record amplifier and the tape preamplifier into electrical connection with the tape head during the record and playback modes. Multiple encoder-decoder circuits are provided and interconnected to the record amplifier and tape preamplifier and each may be actuated to generate in the record mode a cue signal for recording on the tape to control one of the projectors, and each receives in the playback mode the recorded cue signal from the tape recorder, detects the cue signal and generates a projector control signal for application to one of the projectors.

21 Claims, 3 Drawing Figures

MAGNETIC TAPE PROGRAMMING SYSTEM FOR CONTROLLING MULTIPLE ELECTRICAL APPLIANCES

BACKGROUND OF THE INVENTION

This application pertains to a magnetic tape programming system for controlling a plurality of slide projectors from one channel of a magnetic tape recorder.

It is frequently necessary when giving a technical lecture, a sales presentation, or the like, to provide a taped narrative in connection with slide pictures. For convenience the projector control should be synchronized with the tape narrative to automatically control the projectors to change the various slides in correct sequence with the audio narrative. There are several such control devices on the market; however, they suffer from the defect in that they are extremely complicated, using digital or analog computer techniques for controlling the sequence of the operation of the projectors. It takes a highly skilled and trained person to operate these control devices. The devices usually have a large number of components which increases the cost of production and reduces reliability and the mean operating time between failures. The present invention remedies the problems of the prior art by providing a simplified and reliable magnetic tape programming system for controlling the plurality of slide projectors from one channel of a magnetic tape recorder. The projectors may be advanced independently, simultaneously, or in any desired combination.

SUMMARY OF THE INVENTION

The present invention provides a novel magnetic tape programming system for controlling a plurality of slide projectors or other electrical appliances with remote control capability, comprising a magnetic tape means having a plurality of channel tracks, at least one conventional audio high-fidelity pickup, and amplifying means adapted for recording and replaying audio information from at least one channel track of the tape means, a tape head for pickup and recording of projector cue signals from another one of the channel tracks of the tape means, a record amplifier, a tape replay amplifier, and circuit means interconnecting the tape head, record amplifier and tape replay preamplifier for generating in the record mode a series of cue signals for recording on the tape means, each of the cue signals comprising at least one sine wave signal of preselected frequency for controlling at least one of the projectors, and for receiving in the playback mode the recorded cue signals from the tape means, detecting the sine wave signals of preselected frequency comprising each of the cue signals and generating a projector control signal corresponding to each such detected sine wave signal for application to the projectors.

The circuit means described above may comprise a first input switching means for alternately switching the record amplifier and tape playback preamplifier into electrical connection with the tape head during the record and playback modes, a plurality of encoder-decoder circuit means, each adapted for generating in the record mode a sine wave signal of preselected frequency for controlling one of the projectors, and for receiving in the playback mode the recorded cue signals received from the tape playback preamplifier, detecting the sine wave signal of preselected frequency and generating a projector control signal from the detected sine wave signal for application to one of the projectors, and a plurality of first switch means each interconnected to one of the encoder-decoder circuit means which upon actuation causes its respective encoder-decoder circuit means to generate the sine wave signal of preselected frequency for application to the record amplifier and to the tape means.

Accordingly, one primary feature of the present invention is to provide a highly stable, compact, reliable system of frequency selective encoder-decoder circuits which allows multiple control functions for remote electrical equipment, such as slide projectors, to be performed independently, simultaneously, or in any combination from a single channel of magnetic tape.

Another feature of the present invention is to provide an encoder-decoder circuit that allows the capability of simplified switching from the encoder (record mode, for programming of tape) to decoder (playback mode) without changing center frequency.

Yet another feature of the present invention is to provide apparatus to automatically control the remote equipment while the initial tape programming is being performed.

Still another feature of the present invention is to provide associated switching circuits to allow manual override of the taped program.

Another feature of the present invention is to provide a "building block" system utilizing plug-in modules to allow fabrication of systems for automatic control of simple (mono sound, two projectors) to highly complex (stereo or quad sound, multiple projectors) synchronized sound/visual presentations from a magnetic tape, utilizing an interconnect system between modules requiring only a six pin connector on each module.

BRIEF DESCRIPTION OF THE DRAWINGS

In order that the manner in which the above-recited advantages and features of the invention are attained, as well as others which will become apparent, can be understood in detail, a more particular description of the invention may be had by reference to specific embodiments thereof which are illustrated in the appended drawings, which drawings form a part of this specification. It is to be noted, however, that the appended drawings illustrate only typical embodiments of the invention and therefore are not to be considered limiting of its scope, for the invention may admit to further equally effective embodiments.

IN THE DRAWINGS

Figure 1:
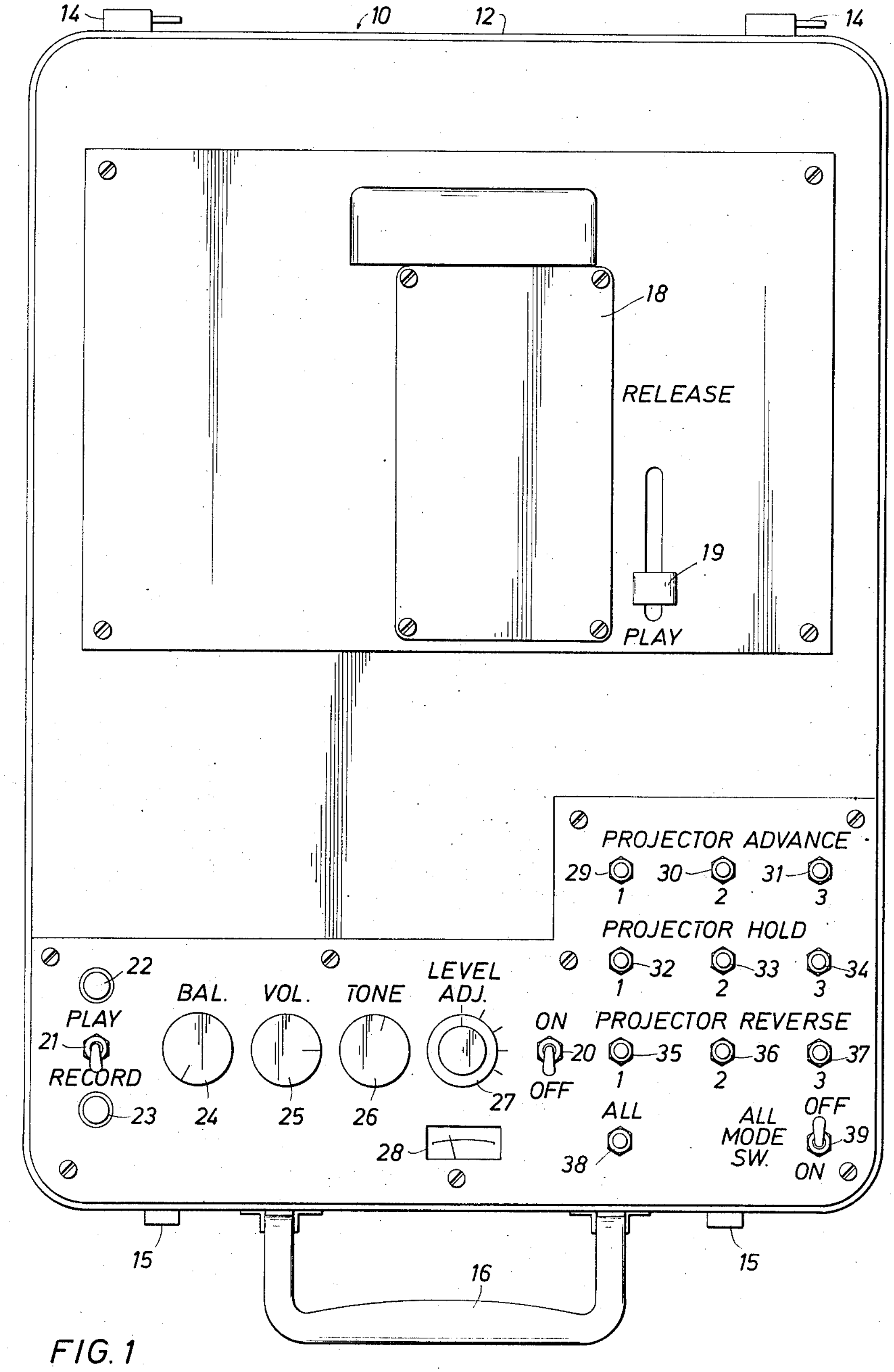

FIG. 1 is a plan view of the portable magnetic tape programming system showing the top cover removed.

Figure 2:
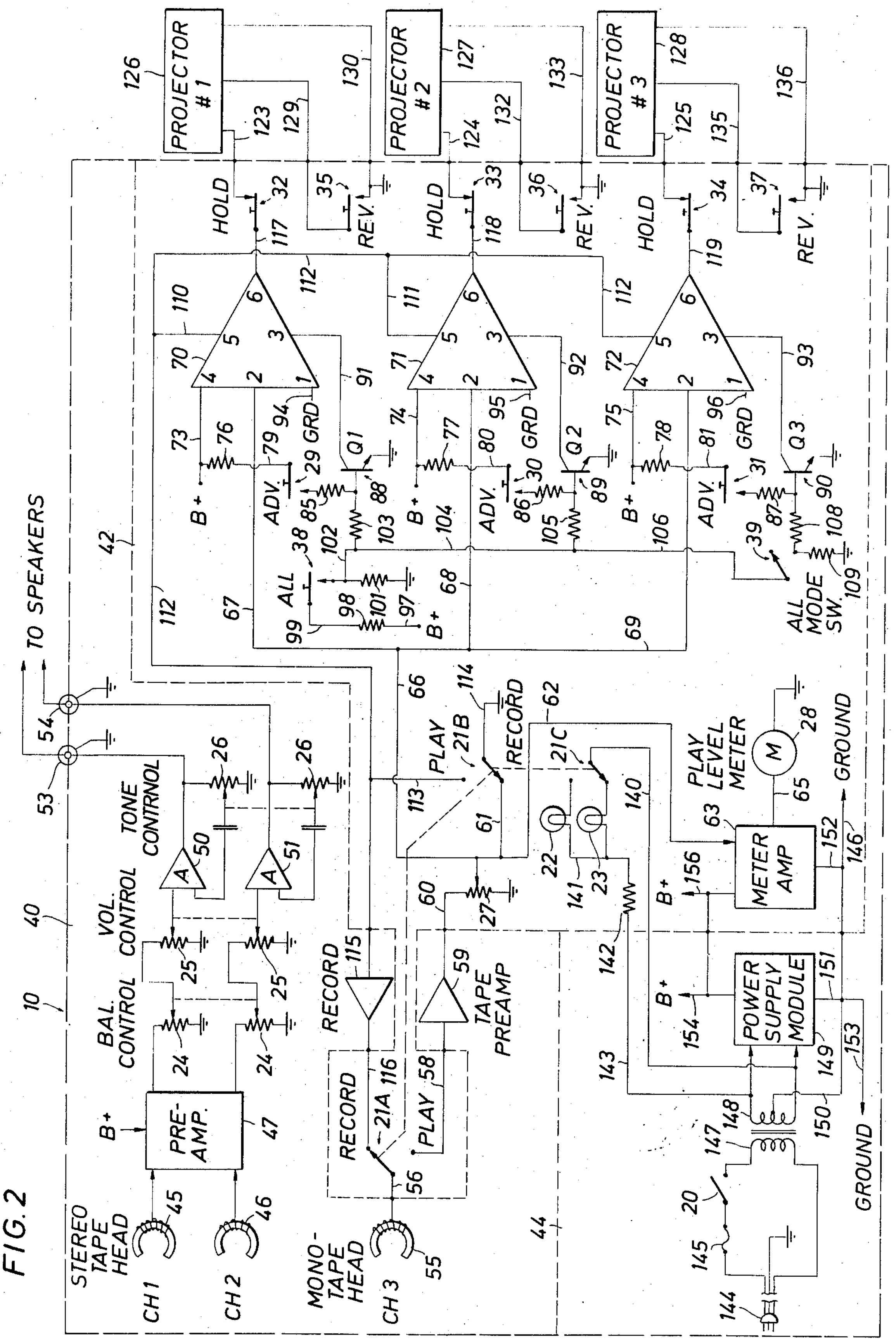

FIG. 2 is an electrical schematic of the magnetic tape programming system.

Figure 3:
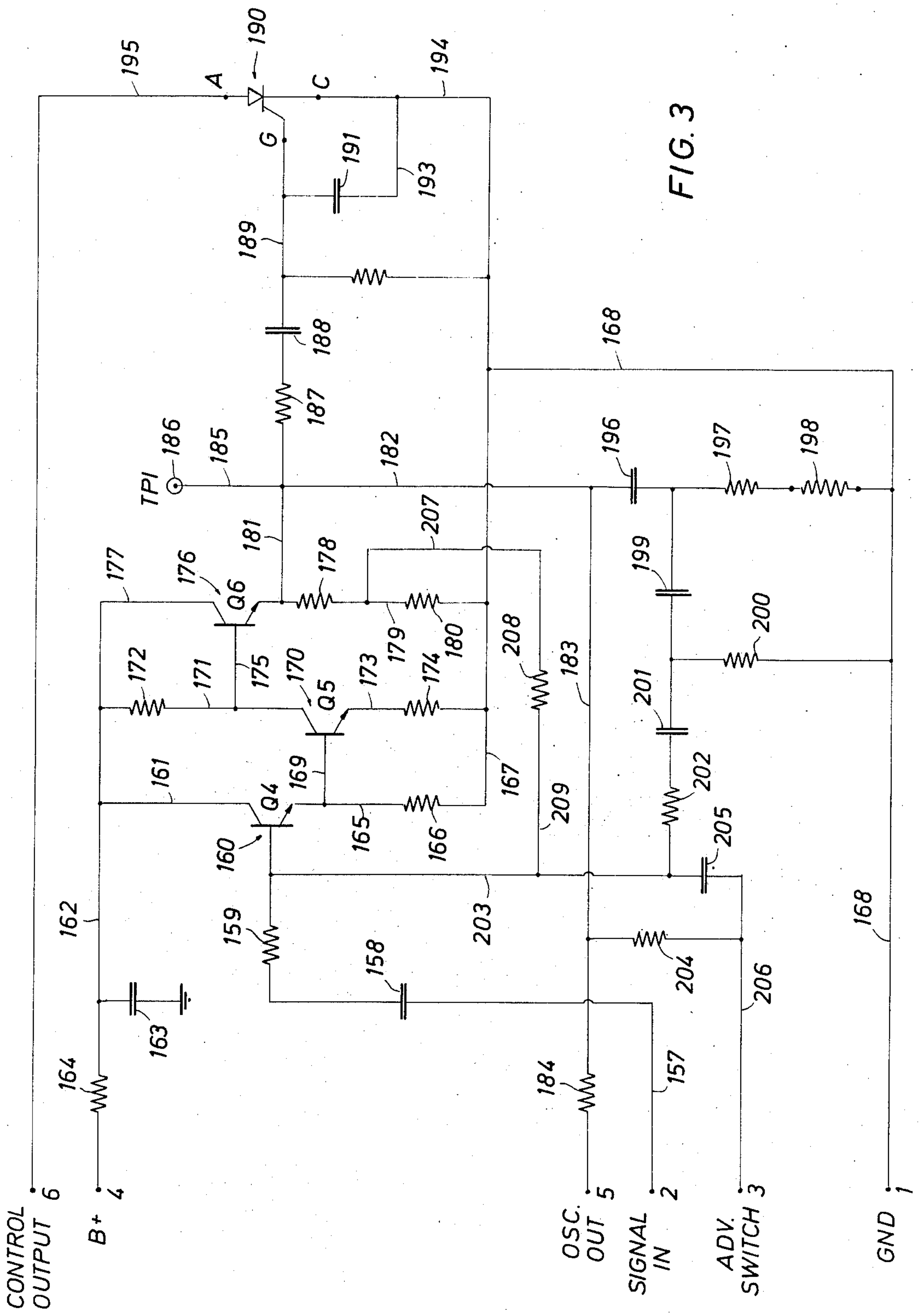

FIG. 3 is an electrical schematic of an encoder-decoder circuit utilized in the magnetic tape programming system.

DETAILED DESCRIPTION OF THE PREFERRED EMBODIMENTS

Referring now to FIG. 1, a plan view of the portable magnetic tape programming system 10 with its top cover removed is shown. The hardware and electrical circuitry is mounted within a portable, easily carried container or case 12 having a handle 16 for easy carrying. The top cover (not shown) is attached by means of take-apart hinges 14 and is locked in place by means of locks 15. A magnetic tape reel unit, continuous-loop cartridge, or cassette 18 is shown in place for operation. A standard PLAY and REWIND control 19 is also shown for operating the tape reel or cassette 18.

The controls for the magnetic tape programming system 10 are clustered in one end of case 12. A standard ON-OFF switch 20 is shown for controlling the electrical power to operate the system. A PLAY-RECORD switch 12 is shown with lamps 22 and 23 that are lighted in the appropriate PLAY or RECORD mode. Balance, volume, and tone controls 24, 25 and 26, respectively, are shown for controlling the high-fidelity audio circuit of the system that is applied to external speakers (not shown). A playback LEVEL ADJUST control 27 and a playback LEVEL meter 28 are shown for visually indicating the playback level of the control signals.

A system for controlling three projectors is shown for simplicity. However, the typical system may control six or more projectors from a single channel of the tape. PROJECTOR ADVANCE switches 29, 30 and 31 are provided, one for each projector. The PROJECTOR ADVANCE switches are utilized in the record mode of the system to generate the control signals recorded on the tape for controlling the projector operation during the playback mode, and in addition, during the record mode, a control signal is sent to the projector to operate the projector when its respective ADVANCE switch is actuated during the programming of the tape. In the playback mode the ADVANCE switch functions to manually override projector control signals. PROJECTOR HOLD switches 32, 33 and 34 are provided for each projector and provide a means of manually overriding a PROJECTOR ADVANCE control signal from the tape during the playback mode. Likewise, PROJECTOR REVERSE switches may also be provided for those projectors having a reverse capability, and these switches are shown as 35, 36 and 37. Actuation of a REVERSE switch causes its respective projector to reverse and return one frame. An ALL switch 38 is shown which may be conveniently utilized during the record mode in the event that all projectors are to be advanced simultaneously. The ALL switch 38 may be depressed thereby simultaneously advancing all three projectors without the necessity of having to depress either switches 29, 30 or 31. An ALL MODE switch 39 is shown as an optional feature which may allow one of the projectors to be disconnected from the ALL switch 38, thereby allowing the simultaneous operation of only the remaining projectors. Here, the third projector control circuit is tied into the ALL MODE switch 39.

Referring now to FIG. 2, a detailed schematic of the magnetic tape programming system 10 for controlling a plurality of slide projectors is shown. System 10 comprises an audio circuit 40, a programming circuit 42, and a power supply circuit 44. Each of these circuits will be discussed hereinafter in detail.

Audio circuit 40 is a conventional high-fidelity audio system that may be a monaural or a stereophonic system. The system shown is a stereophonic system, but, of course, it may be any number of channels, depending on the needs of the user. A stereo tape head 45 and 46, for channels 1 and 2 of the stereophonic system, are shown with their outputs applied to a stereo preamplifier 47. The output of the preamplifier 47 is applied through ganged balance controls 24, ganged volume controls 25, to respective inputs of audio amplifiers 50 and 51 for channels 1 and 2, respectively. The outputs of amplifiers 50 and 51 are applied via ganged tone controls 26 to output speaker jacks 53 and 54 for application to external speakers (not shown). The circuitry for the recording of the audio sound track on channels 1 and 2 of the tape is not shown, but it may also be included in the system as a standard option.

The power supply circuit 44 comprises an electrical outlet plug 144 through which standard 110–120 volt AC power is applied to a power transformer primary winding 147 via fuse 145 and ON-OFF switch 20. The secondary winding 148 of the power transformer applies voltage directly to power supply 149, and via conductor 140 to the PLAY-RECORD switch 21C. Voltage from the secondary winding 148 is also applied via conductor 143, resistor 142, and conductor 141 to PLAY and RECORD lamps 22 and 23, the other side of each lamp being connected to terminals of switch 21C. Power supply 149 generates a DC source voltage (B+) utilized throughout the system and is applied via conductor 154 to the audio circuit and via conductors 155 and 156 to the meter amplifier 63 and to the circuitry of programming circuit 42. The circuit common or ground is taken from the center-tap of secondary winding 148 and is applied via conductor 150 and 151 to power supply 149 and via conductors 150 and 152 to meter amplifier 63 in the programming circuit 42. Conductor 146 provides a common or ground connection to the remaining circuitry of the programming circuit 42.

If a stereo magnetic tape is utilized, then one channel would be utilized for the high-fidelity audio circuit above described, and the second channel would be utilized for the recording of cue signals for controlling the projectors. However, if four or eight channel tapes are used a stereo high-fidelity audio system may be utilized, while one or more of the remaining channels can be used to record the programmed cue signals for control of the projectors. In the system shown, a third channel is utilized and a mono tape head 55 is provided for recording and pickup of the cue signals from the third channel.

The tape head 55 is connected to PLAY-RECORD switch 21A via the programming circuit 42. In the PLAY position, switch 21A would apply signals received from tape head 55 via conductors 56 and 58 to the input of the tape preamplifier 59. The output of preamplifier 59 is applied via conductor 60, playback level adjust control 27, and conductor 61 to PLAY-RECORD switch section 21B. The output of the playback level adjust control 27 is also applied via conductor 62 as an input to meter amplifier 63 where the signal is amplified and applied through conductor 65 to level indicating meter 28 for visual indication of the playback level. The signal output of playback level adjust control 27 is also applied via conductors 66 and 67 to pin 2 of encoder-decoder circuit 70, and via conductors 66 and 68 to pin 2 of encoder-decoder circuit 71, and via conductors 66 and 69 to pin 2 of encoder-decoder circuit 72. Pin 5 of encoder-decoder circuits 70, 71 and 72 is connected via conductors 110, 111 and 112 to the input of record amplifier 115, and additionally via conductor 113 to the PLAY-RECORD switch control 21B. The output of record amplifier 115 is connected to conductor 116 which is in turn connected to PLAY-RECORD section 21A. In the RECORD mode, switch section 21B applies ground potential via conductor 114 to pin 2 of encoder-decoder circuits 70, 71 and 72 via conductors 61, 66, 67, 68 and 69, respectively. Conversely, in the PLAY mode, ground potential is applied via conductor 114 to pin 5 of encoder-decoder circuits 70, 71 and 72 via conductors 113, 110, 111 and 112.

B+ is applied via conductor 73 to pin 4 of encoder-decoder circuit 70 and through resistor 76 and conductor 79 to one terminal of normally open ADVANCE switch 29. B+ is also applied via conductor 74 to pin 4 of encoder-decoder circuit 71 and through resistor 77 and conductor 80 to one terminal of normally open ADVANCE switch 30. Similarly, B+ supply voltage is applied via conductor 75 to pin 4 of encoder-decoder circuit 72 and through resistor 78 and conductor 81 to one terminal of normally open ADVANCE switch 31. Three transistors, Q1, Q2, and Q3, 88, 89 and 90, respectively, are connected in a common emitter configuration with the base lead of transistor 88 connected to ground potential via resistors 103 and 101 and conductor 102, the base lead of transistor 89 being connected to ground potential through resistors 105 and 101 and conductors 104 and 102, and the base lead of transistor 90 is connected to ground potential via resistors 108 and 109 or via resistors 108, 101, ALL MODE switch 39 and conductors 106, 104 and 102. ADVANCE switch 29 is connected to the base lead of transistor 88 via resistor 85, and similarly, ADVANCE switch 30 is connected via resistor 86 to the base lead of transistor 89 and ADVANCE switch 31 is connected via resistor 87 to the base lead of transistor 90. The collector lead of transistors 88, 89 and 90 is connected via conductors 91, 92 and 93 to pin 3 of encoder-decoder modules 70, 71 and 72, respectively. Circuit common or ground is applied to pin 1 of encoder-decoder modules 70, 71 and 72 via conductors 94, 95 and 96, respectively. B+ is also applied via conductor 97, resistor 98, and conductor 99 to one terminal of ALL switch 38. The other terminal of ALL switch 38 is connected to conductor 102 and thence through resistor 103 to the base lead of transistor 88, via conductors 102, 104 and resistor 105 to the base lead of transistor 89, and via conductor 102, 104, 106, ALL MODE switch 39 and resistor 108 to the base lead of transistor 90.

Pin 6 of encoder-decoder modules 70, 71 and 72 is connected via conductors 117, 118 and 119 to one terminal of normally closed HOLD switches 32, 33 and 34, respectively. The other terminal of HOLD switches 32, 33 and 34 is connected by conductors 123, 124 and 125 to projectors 126, 127 and 128, respectively. Normally open REVERSE switches 35, 36 and 37 are shown, with REVERSE switch 35 having one terminal connected through conductor 129 to the first projector 126 and its other terminal connected to ground potential and via conductor 130 to the first projector 126. REVERSE switch 36 has one terminal connected by conductor 132 to the second projector 127 and its other terminal connected to ground potential and through conductor 133 to the second projector 127. REVERSE switch 37 similarly has one terminal connected by conductor 135 to the third projector 128 and its other terminal connected to ground potential and via conductor 136 to the third projector 128.

In operation, it is necessary to control the operation of slide projectors 1, 2 and 3. Projectors 1, 2 and 3 are to project slides that have a tape-recorded audio sound track. The audio sound track would be replayed from the tape channels 1 and 2 via the stereo audio circuit 40 previously described. On one of the remaining channels of the tape, channel 3 as illustrated, the cue signals for the projectors would be programmed in synchronization with the audio sound track on channels 1 and 2. If the projectors are connected and operating, they will be activated during the programming of the control signals onto channel 3 of the tape. When it is desired to advance projector 1, ADVANCE switch 29 would be depressed, applying B+ via resistor 76, conductor 79, switch 29 and resistor 85 to the base lead of transistor 88, thereby turning on transistor 88 and applying ground potential from the collector lead through conductor 91 to pin 3 of the encoder-decoder circuit 70. At the same time, with the PLAY-RECORD switch set in the RECORD position, ground potential is applied via conductor 114, switch 21B and conductor 61, 66 and 67 to pin 2 of encoder-decoder circuit 70. With ground potential applied to pins 2 and 3 of encoder-decoder circuit 70 (ADVANCE switch 29 actuated), the encoder-decoder circuit 70 functions as an encoder (oscillator) and generates a sine wave signal of preselected frequency which is applied out through pin 5 of encoder-decoder circuit through conductors 110 and 112 to record amplifier 115. The output of record amplifier 115 is applied via conductor 116 through switch section 21A and conductor 56 to the tape head 55 for recording the sine wave signal of a preselected frequency on the tape channel as a cue signal for controlling the action of the first projector 126. At the same time that the sine wave signal is applied out through pin 5, a control signal is generated by encoder-decoder circuit 70 and applied through pin 6, conductor 117, HOLD switch 32 and conductor 123 to the first projector 126 to cause it to advance in sequence at the same time as the sine wave cue signal is being recorded on the tape.

When switch 21B is positioned to the RECORD mode as above mentioned, ground potential is applied via conductors 114, switch 21B, conductors 61, 66 and 68 to pin 2 of encoder-decoder circuit 71 and via conductors 66 and 69 to pin 2 of encoder-decoder circuit 72. Similarly, if ADVANCE switch 30 is actuated, B+ through resistor 77, conductor 80, switch 30 and resistor 86 is applied to the base lead of transistor 89, turning on transistor Q2 and applying ground potential to the collector lead and through conductor 92 to pin 3 of encoder-decoder circuit 71. With pins 2 and 3 connected to ground potential, the encoder-decoder circuit 71 acts as an encoder (oscillator) and generates a sine wave signal of preselected frequency which is applied out to pin 5 and through conductor 111 and 112 to the record amplifier 115 to be recorded by the tape head 55 as hereinabove described for encoder-decoder circuit 71. If ADVANCE switch 31 is actuated, B+ is applied through resistor 78, conductor 81, switch 31 and resistor 87 to the base lead of transistor 90, thus turning on transistor Q3 and applying ground potential through the collector lead and conductor 93 to pin 3 of encoder-decoder circuit 72. With ground potential applied to pins 2 and 3 of encoder-decoder circuit 72, the circuit acts as an encoder (oscillator) and generates a sine wave signal of preselected frequency which is applied out through conductor 112 to record amplifier 115 and thence to the tape head 55 for recording as hereinabove described for the other encoder-decoder circuits. Similarly, when a sine wave signal of preselected frequency is generated by encoder-decoder circuits 71 and 72, a projector control pulse is applied through pin 6, conductor 118, switch 33, and conductor 124 to the second projector 127 and through pin 6, conductor 119, switch 34, and conductor 125 to the third projector 128, respectively. Upon receipt of the control signal, projectors 2 and 3 are advanced in sequence as was projector 1 as hereinabove described.

With ALL MODE switch 39 closed, and if ALL switch 38 is actuated, B+ is applied via conductor 97, resistor 98, conductor 99, switch 38, conductor 102 and resistor 102 to the base lead of transistor 88; via conductors 102 and 104 and resistor 105 to the base lead of transistor 89; and via conductors 102, 104, and 106, switch 39 and resistor 108 to the base lead of transistor 90 to turn on the respective transistors Q1, Q2 and Q3, thereby simultaneously applying ground potential to pin 3 of encoder-decoder circuits 70, 71 and 72, thereby causing each encoder-decoder circuit to simultaneously operate as encoders (oscillators) and generate a sine wave signal of preselected frequency for application through record amplifier 115 to the tape head 55 for recording as a cue signal on the tape channel. Similarly, a control signal from each encoder-decoder circuit 70, 71 and 72 is simultaneously generated and applied to projectors 126, 127 and 128 from pin 6 of the encoder-decoder circuits as hereinabove described for causing the projectors to simultaneously advance. In this way, simultaneous advance of the projectors can be achieved during the RECORD mode and simultaneous recording of the sine wave signals of preselected frequency from each encoder-decoder circuit may be recorded on the tape for simultaneous control of the three projectors.

In the event that it is desired that projector 3 is not to be simultaneously actuated, the ALL MODE switch 39 can be opened and the actuation of the ALL switch 38 will cause only the simultaneous operation of encoder-decoder circuits 70 and 71 and the simultaneous operation of projectors 126 and 127. The third encoder-decoder circuit 72 and its associated projector 128 may be operated individually by ADVANCE switch 31. Of course, each ADVANCE switch associated with each of the encoder-decoder circuits 70, 71 and 72 may have an ALL MODE switch similar to switch 39 if desired. If the ALL MODE or simultaneous operation of the encoder-decoder circuits is not desired, the ADVANCE switches 29, 30 and 31 can be simplified. One terminal of the normally open ADVANCE switch can be connected to pin 3 of the encoder-decoder circuit and the other terminal of the switch can be connected directly to ground potential and eliminate transistors Q1, Q2 and Q3 with associated circuitry.

With the PLAY-RECORD switch positioned to the PLAY mode, tape head 55 picks up the recorded cue signals on the tape and applies them via conductor 56, switch 21A, and conductor 58 to the input of tape playback preamplifier 59. The output of preamplifier 59 is applied via conductor 60 to playback level control 27 and by conductor 62 to meter amplifier 63 and from amplifier 63 via conductor 65 to playback level meter 28. By adjusting control 27 the playback level may be adjusted and the level will be visually indicated by meter 28.

The signals picked up by tape head 55 will also be applied from the output of level control 27 through conductors 66 and 67 as an input to pin 2 of encoder-decoder circuit 70 and through conductors 66 and 68 to pin 2 of encoder-decoder circuit 71 and through conductors 66 and 69 to pin 2 of encoder-decoder circuit 72. Ground potential would be applied through conductor 114, switch section 21B, conductors 113, 112 and 110 to pin 5 of encoder-decoder circuit 70, via conductors 113, 112 and 111 to pin 5 of encoder-decoder circuit 71, and through conductor 113 and 112 to pin 5 of encoder-decoder circuit 72. With ground potential applied to pin 5 of each of the encoder-decoder circuits and an input audio signal applied to pin 2 of each of the encoder-decoder circuits, the encoder-decoder circuits function as a decoder (active bandpass filter) to detect its respective sine wave signal of preselected frequency from the cue signals played back from the tape and applied to each of the encoder-decoder circuits through terminal 2. When the sine wave signal or preselected frequency is detected by encoder-decoder circuit 70, a control signal is generated and applied via pin 6, conductor 117, HOLD switch 32, and conductor 123 to the first projector 126 to cause the projector to advance. Similarly, a control signal is generated and applied out via pin 6 of encoder-decoder circuits 71 and 72 to cause their respective projectors 127 and 128 to advance as hereinabove described.

During the playback mode, if the HOLD switches 32, 33 and 34 are actuated, the circuit between pin 6 of encoder-decoder circuits 70, 71 and 72 to respective projectors 126, 127 and 128 is broken, and thus the control signal generated as an output from pin 6 of any of the encoder-decoder circuits may be blocked and prevented from reaching its respective projector. In this way, the control signals generated by the encoder-decoder circuits 70, 71 and 72 may be overridden by the HOLD switches 32, 33 and 34 and prevent the ADVANCE signals from being applied to projectors 126, 127 and 128, respectively. Similarly, if the ADVANCE switch is actuated during the playback mode, an ADVANCE control signal will be generated as hereinabove described for overriding the taped program.

If REVERSE switch 35 is actuated, a circuit is completed and ground potential is applied between conductors 129, switch 35 and conductor 130 to the first projector 126, thereby causing it to reverse in sequence. Similarly, reverse sequence can be applied to second and third projectors 127 and 128, respectively, by means of actuation of REVERSE switches 36 and 37, respectively.

The ADVANCE switches 29, 30 and 31 function as a plurality of first switch means, each interconnected to respective encoder-decoder circuits 70, 71 and 72, respectively, to cause the respective encoder-decoder circuit to generate a sine wave signal of preselected frequency for application to the record amplifier 115 and thence to the record head 55 for recording on the tape as an audio cue signal. The ALL switch 38 functions as a second switch means interconnected to the plurality of first switch means comprising ADVANCE switches 29, 30 and 31, and transistors 88, 89 and 90, which upon actuation causes each of the plurality of first switch means to simultaneously actuate its respective encoder-decoder circuit 70, 71 and 72, to apply a plurality of simultaneous sine wave signals of preselected frequencies as a discrete audio cue signal to the record amplifier 115 and to the tape for recording.

The ALL MODE switch 39 functions as a third switch means interconnected between the second switch means 38 and at least one of the plurality of first switch means, ADVANCE switch 31 and transistor 90, for optionally connecting the at least one first switch means with the second switch means. The HOLD switches 32, 33 and 34 function as a fourth switch means for selectively disconnecting the projector control output of the encoder-decoder circuits 70, 71 and 72, respectively, for prohibiting passage of selected ones of the projector control signals during the playback mode. The REVERSE switches 35, 36 and 37 function as a plurality of fifth switch means electrically connected to ground potential, for generating a reverse control signal for application to the projectors 126, 127 and 128, respectively.

Each encoder-decoder circuit functions as a circuit means adapted for generating in the record mode a sine wave signal of preselected frequency for controlling one of the projectors and for receiving in the playback mode the recorded discrete audio cue signals received from the tape playback preamplifier 59, detecting the sine wave signals of preselected frequency and generating a control signal corresponding to the detected sine wave signal for application to its respective projector. PLAY-RECORD switch section 21A functions as a first input switching means for alternately switching the amplifier 115 and the tape playback preamplifier 59 into electrical connection with the tape head 55 during the record and playback modes. The PLAY-RECORD switch section 21B functions as a second input switching means ganged to the first switch section 21A for applying ground potential to the input pin 2 of each of the respective encoder-decoder circuits in the record mode and to the encoder output pin 5 of each of the encoder-decoder circuits during the playback mode.

Referring now to FIG. 3, a detailed schematic of the encoder-decoder circuit is shown. Each encoder-decoder circuit comprises an amplifier circuit means having cascaded transistors Q4, Q5 and Q6, the circuit having a decoder input via pin 2, conductor 157, coupling capacitor 158 and input resistor 159 to the base lead of a transistor 160 (Q4) connected in an emitter-follower configuration. The collector lead of transistor 160 is connected to a source of supply voltage B+ through conductors 161 and 162 and resistor 164. The emitter lead of transistor 160 is connected by conductor 165, resistor 166, and conductors 167 and 168 to ground potential. The emitter of transistor 160 is also connected by conductor 169 to the base lead of a second transistor 170 (Q5) which is connected in a common emitter configuration. The emitter of transistor 170 is connected by conductor 173, resistor 174, conductor 167, and 168 to ground potential. The collector lead of transistor 170 is connected to B+ via conductor 171 and resistor 172. A third transistor 176 (Q6) is cascaded in series with transistor 170, the base lead of transistor 176 being connected to the collector lead of transistor 170 by conductor 175. The collector lead of transistor 176 is connected directly to B+ via conductor 177, 162 and resistor 164. The emitter lead of transistor 176 is connected via resistor 178, conductor 179, resistor 180, and conductors 167 and 168 to a source of ground potential. The emitter lead of transistor 176 is also connected via conductors 181 and 185 to a test point jack 186 and via conductors 181, resistor 187, capacitor 188, and conductor 189 to the gate lead of an SCR 190. The anode lead of SCR 190 is connected via conductor 195 to pin 6 through which the projector control signal is applied. The cathode lead of SCR 190 is connected via conductor 194 and 168 to ground potential via pin 1. Shunt capacitor 191 shunts the gate and cathode leads of SCR 190 by means of conductors 192 and 193.

The emitter lead of transistor 176 is also connected through resistor 178, conductor 179, conductor 207, resistor 208, conductor 209 and conductor 203 back to the base lead of transistor 160 as a resistive feedback network. A first RC feedback network is connected to the emitter lead of transistor 176 by conductors 181, 182, capacitor 196, resistors 197 and 198, capacitor 199, resistor 200, capacitor 201, resistor 202 and conductor 203 back to the base lead of transistor 160. A second RC reedback network is connected to the emitter lead of transistor 176 by conductors 181, 182 and 183, resistor 204, capacitor 205 and conductor 203 to the base lead of transistor 160. The junction of resistor 204 and capacitor 205 in the second RC feedback network is also connected via conductor 206 to pin 3 of the circuit. The emitter lead of transistor 176 is also connected via conductors 181, 182 and 183 and resistor 184 to the output pin 5 which is the encoder (oscillator) output of the encoder-decoder circuit.

In operation (referring to FIGS. 2 and 3), in the RECORD mode, as hereinabove previously described, ground potential is applied to pin 2 of the encoder-decoder circuit by the action of PLAY-RECORD switch section 21B. When the ADVANCE switch associated with the respective encoder-decoder circuits is actuated, ground potential is applied to the ADVANCE switch input terminal 3 of the encoder-decoder circuit, thereby applying ground potential to the junction between resistor 204 and capacitor 205. In this state, the amplifier circuit means comprising Q4, Q5 and Q6 comprises an amplifier circuit means with a 180° signal phase shift having the first RC feedback network, above described, and the resistive feedback network, above described, dooperating with the amplifier circuit means to form a modified bridge-differentiator oscillator circuit for generating a sine wave signal of preselected frequency, the frequency determined by the values of the resistive-capacitive elements of the first RC feedback network. The resistive feedback network comprising resistor 208 provides a means for stabilizing all the parameters of the amplifier circuit during operation and minimizes any changes in the desired characteristics of the unit which might result from changes in the values of the components, changes in temperature, or from variations in $\beta$ of transistors Q4, Q5 and Q6. The second RC feedback network, above described, is shorted to ground potential by action of the application of ground potential to pin 3.

Upon generation of the sine wave signal of preselected frequency, the signal is applied via conductor 181, resistor 187, capacitor 188, conductor 189 to the gate lead of SCR 190, thus gating on the SCR and applying a control signal via conductor 195 and pin 6 to the projector as hereinabove described. Simultaneously, the sine wave signal of preselected frequency is applied via conductors 181, 182 and 183, and resistor 184 through pin 5 as the encoder (oscillator) output to be applied back to the record amplifier 115 (see FIG. 2) for recording on the tape channel.

With the PLAY-RECORD switch 21B set in the PLAY mode (see FIG. 2), ground potential is applied to pin 5 of the encoder-decoder circuit and the cue signals from the tape are applied to the encoder-decoder circuits through pin 2, conductor 157, coupling capacitors 158 and input resistor 159 to the input of the amplifier circuit means comprising transistors 160, 170 and 176. Ground potential is removed from the ADVANCE switch pin 3 and the junction between resistor 204 and capacitor 205 is no longer at ground potential and resistor 204 and capacitor 205 therefore acts as a second RC feedback network, above described. The first and second RC feedback networks cooperate with the amplifier circuit means to operate as a decoder (active bandpass filter), the center frequency of the filter being determined by the resistor-capacitor values of the first RC feedback network, and the band width of the filter being determined by the values of resistor 204 and capacitor 205 of the second RC feedback network. The detected sine wave signal of preselected frequency is applied from emitter lead of transistor 176 via conductor 181, resistor 187, capacitor 188, conductor 189, to the gate lead of SCR 190 for triggering SCR 190 and applying a projector control signal via conductor 195 and pin 6 to the associated projector.

The gain of the active bandpass filter in the playback mode may be adjusted as desired by varying resistance 159. The frequencies at which the encode-decoder circuits will operate are preselected and typical frequencies when controlling three projectors as shown would be for one of the encoder-decoder circuits to operate at 75 Hz, a second encoder-decoder circuit to operate at 167 Hz, and the third encoder-decoder circuit to operate at 400 Hz. Of course, any preselected frequency may be utilized, but it is generally preferably that the frequency division be at least on the order of 2:1 or greater, so that there is sufficient separation between the sine wave signals of preselected frequency that are generated and detected. As hereinabove described, the frequency of the oscillator and the detector frequency of the bandpass filter is determined by the resistor-capacitor components of the first RC feedback network comprising capacitor 196, resistors 197 and 198, capacitor 199, resistor 200, capacitor 201, and resistor 202. The resistor 197 may be a variable resistor to accurately set and adjust the frequency. However, in practice the resistor 197 is chosen to obtain a frequency that is close to the desired frequency and then a second resistor 198 is added to adjust the frequency to the precise value desired. In this way, no change in the frequency may be made by careless or inadvertent adjustment of a variable resistor or potentiometer. The circuit disclosed lends itself to a "building block" design. The encoder-decoder circuits 70, 71 and 72 with associated ADVANCE switches 29, 30 and 31 may conveniently be constructed as separate plug-in modules or circuit boards. The power supply circuit 44 may be a separate module or it may be combined with meter amplifier 63 in a separate module or plug-in circuit. Other portions of the audio recording circuits would lend themselves to modularization.

A separate programming circuit for operating a plurality of slide projectors in connection with a remote magnetic tape recording and playback system may be devised, not having its own internal audio and tape recording circuits. Such a programming circuit would include programming circuit 42 and power supply circuit 44, with the record amplifier 115 tape playback preamplifier 59 and tape head 55 being located in a remote tape recording system. Thus, a separate programming unit or circuit for controlling the operation of several slide projectors in connection with a separate remote magnetic tape recording and playback system may be utilized.

Numerous variations and modifications may obviously be made in the structure herein described without departing from the present invention. Accordingly, it should be clearly understood that the forms in the invention herein described and shown in the figures of the accompanying drawings are illustrative only and are not intended to limit the scope of the invention.

What is claimed is:

1. A magnetic tape programming system for independently or simultaneously controlling a plurality of remote electrical appliances, comprising magnetic tape means having a plurality of channel tracks, at least one conventional audio high-fidelity amplifying means adapted for recording and replaying audio information from at least one channel track of said tape means, a tape head for recording and replay of signals from another one of said channel tracks of said tape means, a record amplifier, a tape replay preamplifier, circuit means interconnecting said tape head, record amplifier, and tape replay preamplifier for generating in the record mode a series of cue signals for recording on said tape means, each of said cue signals comprising at least one sine wave signal of preselected frequency for controlling at least one of the appliances, and for receiving in the playback mode said recorded cue signals from said tape means, detecting the sine wave signals of preselected frequency comprising each of said cue signals and generating a control signal corresponding to each such detected sine wave signal for application to the appliances, first input switching means for alternately switching said record amplifier and said tape playback preamplifier into electrical connection with said tape head during the record and playback modes, a plurality of encoder-decoder circuit means, each adapted for generating in the record mode a sine wave signal of preselected frequency for controlling one of the appliances, and for receiving in the playback mode said recorded cue signals from said tape playback preamplifier, detecting said sine wave signal of preselected frequency and generating a control signal corresponding to said detected sine wave signal for application to one of the appliances, and signal for application to one of the projectors, a plurality of first switch means each interconnected to one of said encoder-decoder circuit means which upon actuation causes its respective encoder-decoder circuit means to generate said sine wave signal of preselected frequency for application to said record amplifier and to said tape means, second switch means interconnected to said plurality of first switch means which upon actuation causes each of said plurality of first switch means to simultaneously actuate its respective encoder-decoder circuit means to apply a plurality of simultaneous sine wave signals of preselected frequencies as a cue signal to said record amplifier and said tape means for recording, and at least one third switch means interconnected between said second switch means and at least one of said plurality of first switch means for optionally connecting said at least one first switch means with said second switch means.

2. The circuit means described in claim 1, including fourth switch means for selectively disconnecting the appliance control output of said encoder-decoder for prohibiting passage of selected ones of said appliance control signals during the playback mode.

3. The circuit means described in claim 2, including a plurality of fifth switch means electrically connected to ground potential, each of said fifth switch means generating an additional control signal applicable to one of the appliances.

4. A magnetic tape programming system for independently or simultaneously controlling a plurality of remote electrical appliances, comprising magnetic tape means having a plurality of channel tracks, at least one conventional audio high-fidelity amplifying means adapted for recording and replaying audio information from at least one channel track of said tape means, a tape head for recording and replay of signals from another one of said channel tracks of said tape means, a record amplifier, a tape replay preamplifier, circuit means interconnecting said tape head, record amplifier, and tape replay preamplifier for generating in the record mode a series of cue signals for recording on said tape means, each of said cue signals comprising at least one sine wave signal of preselected frequency for controlling at least one of the appliances, and for receiving in the playback mode said recorded cue signals from said tape means, detecting the sine wave signals of preselected frequency comprising each of said cue signals and generating a control signal corresponding to each such detected sine wave signal for application to the appliances, first input switching means for alternately switching said record amplifier and said tape playback preamplifier into electrical connection with said tape head during the record and playback modes, a plurality of encoder-decoder circuit means, each adapted for generating in the record mode a sine wave signal of preselected frequency for controlling one of the appliances, and for receiving in the playback mode said recorded cue signals from said tape playback preamplifier, detecting said sine wave signal of preselected frequency and generating a control signal corresponding to said detected sine wave signal for application to one of the appliances, and signal for application to one of the projectors, a plurality of first switch means each interconnected to one of said encoder-decoder circuit means which upon actuation causes its respective encoder-decoder circuit means to generate said sine wave signal of preselected frequency for application to said record amplifier and to said tape means, said encoder-decoder circuit means comprising, amplifier circuit means having an input and output, a first RC feedback network connected between the output and input of said amplifier circuit means for cooperating with said amplifier circuit means to form an oscillator circuit for generating a sine wave signal of preselected frequency during the record mode, said first RC feedback network further cooperating with said amplifier circuit means for forming an active bandpass filter for detecting a sine wave signal of preselected frequency during the playback mode, a second RC feedback network connected between the output and input of said amplifier circuit means for cooperating with said amplifier circuit means and said first RC feedback network to control the band width of said active bandpass filter during said playback mode, said second RC feedback network being connected by one of said plurality of first switching means to ground potential during the record mode, switching circuit means connected to the output of said amplifier circuit means for generating a control signal for application to one of the appliances when said oscillator circuit generates a sine wave signal of preselected frequency during the record mode and when said active bandpass filter detects said sine wave signal of preselected frequency during the playback mode, and second input switching means ganged to said first input switching means for applying ground potential to the input of said amplifier circuit means during the record mode.

5. The encoder-decoder circuit described in claim 4, including a resistive feedback network between the output and input of said amplifier circuit means for stabilizing all parameters of said amplifier circuit means during operation.

6. The encoder-decoder circuit described in claim 5, wherein said amplifier circuit means comprises a first transistor connected in an emitter follower configuration, the base lead of which is connected to the outputs of said first, second and resistive feedback networks, a second transistor cascaded in series with said first transistor and connected in a common emitter configuration, and a third transistor cascaded in series with said second transistor and connected in an emitter follower configuration, the emitter lead of said third transistor connected to said switching circuit means and to the inputs of said first, second and resistive feedback networks.

7. The encoder-decoder circuit described in claim 6, wherein said switching circuit means comprises a silicon controlled rectifier, the gate lead of which is connected to the emitter lead of said third transistor.

8. A programming circuit for independently or simultaneously controlling a plurality of remote electrical appliances in connection with a remote magnetic tape recording and playback system, comprising a plurality of encoder-decoder circuit means, each adapted for generating in the record mode, a sine wave signal of preselected frequency for recording by the magnetic tape recording and playback system and for generating a control signal for operating one of the appliances, each of said encoder-decoder circuits receiving in the playback mode the recorded cue signals from the magnetic tape recording and playback system for detecting said sine wave signal of preselected frequency and generating a control signal corresponding to said detected sine wave signal for application to one of the appliances, a plurality of first switch means each interconnected to one of said encoder-decoder circuit means which upon actuation causes its respective encoder-decoder circuit means to generate said sine wave signal of preselected frequency for application to the magnetic tape recording and playback system for recording as a cue signal, second switch means interconnected to said plurality of first switch means which upon actuation causes each of said plurality of first switch means to simultaneously actuate its respective encoder-decoder circuit means to apply a plurality of simultaneous sine wave signals of preselected frequencies as a cue signal to the magnetic tape recording and playback system for recording, and at least one third switch means interconnected between said second switch means and at least one of said plurality of first switch means for optionally connecting said at least one first switch means with said second switch means.

9. The circuit means described in claim 8, including fourth switch means for selectively disconnecting the projector control output of said encoder-decoder for prohibiting passage of selected ones of said appliance control signal.

10. The circuit means described in claim 9, including a plurality of fifth switch means electrically connected to ground potential, each of said fifth switch means generating a reverse control signal applicable to one of the appliances.

11. A programming circuit for independently or simultaneously controlling a plurality of remote electrical appliances in connection with a remote magnetic tape recording and playback system, comprising a plurality of encoder-decoder circuit means, each adapted for generating in the record mode, a sine wave signal of preselected frequency for recording by the magnetic tape recording and playback system and for generating a control signal for operating one of the appliances, each of said encoder-decoder circuits receiving in the playback mode the recorded cue signals from the magnetic tape recording and playback system for detecting said sine wave signal of preselected frequency and generating a control signal corresponding to said detected sine wave signal for application to one of the appliances, a plurality of first switch means each interconnected to one of said encoder-decoder circuit means which upon actuation causes its respective encoder-decoder circuit means to generate said sine wave signal of preselected frequency for application to the magnetic tape recording and playback system for recording as a cue signal, said encoder-decoder circuit means comprising, an amplifier circuit means having an input and output, a first RC feedback network connected between the output and input of said amplifier circuit means for cooperating with said amplifier circuit means to form an oscillator circuit for generating a sine wave signal of preselected frequency during the record mode, said first RC feedback network further cooperating with said amplifier circuit means for forming an active bandpass filter for detecting a sine wave signal of preselected frequency during the playback mode, a second RC feedback network connected between the output and input of said amplifier circuit means and said first RC feedback network for cooperating with said amplifier circuit means and said first RC feedback network to control the band width of said active bandpass filter during said playback mode, said second RC feedback network being connected by one of said plurality of first switch means to ground potential during the record mode, switching circuit means connected to the output of said amplifier circuit means for generating a control signal for application to one of the appliances when said oscillator circuit generates a sine wave signal of preselected frequency during the record mode and when said active bandpass filter detects said sine wave signal of preselected frequency during the playback mode, and input switching means for applying ground potential to the input of said amplifier circuit means during the record mode.

12. The encoder-decoder circuit described in claim 11, including a resistive feedback network between the output and input of said amplifier circuit means for stabilizing all parameters of said amplifier circuit means during operation.

13. The encoder-decoder circuit described in claim 12, wherein said amplifier circuit means comprises a first transistor connected in an emitter follower configuration, the base lead of which is connected to the outputs of said first, second and resistive feedback networks, a second transistor cascaded in series with said first transistor and connected in a common emitter configuration, and a third transistor cascaded in series with said second transistor and connected in an emitter follower configuration, the emitter lead of said third transistor connected to said switching circuit means and to the inputs of said first, second and resistive feedback networks.

14. The encoder-decoder circuit described in claim 13, wherein said switching circuit means comprises a silicon controlled rectifier the gate lead of which is connected to the emitter lead of said third transistor.

15. A magnetic tape programming system for controlling a plurality of slide projectors, comprising magnetic tape means having a plurality of channel tracks, at least one conventional audio high-fidelity amplifying means adapted for recording and replaying audio information from at least one channel track of said tape means, a tape head for pickup and recording of audio signals from another one of said channel tracks of said tape means, a record amplifier, a tape replay preamplifier, first input switching means for alternately switching said record amplifier and said tape playback preamplifier into electrical connection with said tape head during the record and playback modes, a plurality of encoder-decoder circuit means, each adapted for generating in the record mode a sine wave signal of preselected frequency for controlling one of the projectors and applied to said record amplifier and tape head for recording on said magnetic tape means, and for receiving in the playback mode recorded cue signals from said tape playback preamplifier, detecting said sine wave signal of preselected frequency and generating a control signal corresponding to said detected sine wave signal for application to one of the projectors, a plurality of first switch means each interconnected to one of said encoder-decoder circuit means which upon actuation causes its respective encoder-decoder circuit means to generate said sine wave signal of preselected frequency for application to said record amplifier and to said tape means as a cue signal and simultaneously applying a control signal to one of the projectors, second switch means interconnected to said plurality of first switch means which upon actuation causes each of said plurality of first switch means to simultaneously actuate its respective encoder-decoder circuit means to apply a plurality of simultaneous sine wave signals of preselected frequencies to said record amplifier for recording on said tape means, and at least one third switch means interconnected between said second switch means and at least one of said plurality of first switch means for optionally connecting said at least one first switch means with said second switch means.

16. The circuit means described in claim 15, including fourth switch means for selectively disconnecting the projector control output of said encoder-decoder for prohibiting passage of selected ones of said projector control pulses during the playback mode.

17. The circuit means described in claim 16, including a plurality of fifth switch means electrically connected to ground potential, each of said fifth switch means generating a reverse control signal applicable to one of the projectors.

18. A magnetic tape programming system for controlling a plurality of slide projectors, comprising magnetic tape means having a plurality of channel tracks, at least one conventional audio high-fidelity amplifying means adapted for recording and replaying audio information from at least one channel track of said tape means, a tape head for pickup and recording of audio signals from another one of said channel tracks of said tape means, a record amplifier, a tape replay preamplifier, first input switching means for alternately switching said record amplifier and said tape playback preamplifier into electrical connection with said tape head during the record and playback modes, a plurality of encoder-decoder circuit means, each adapted for generating in the record mode a sine wave signal of preselected frequency for controlling one of the projectors and applied to said record amplifier and tape head for recording on said magnetic tape means, and for receiving in the playback mode recorded cue signals from said tape playback preamplifier, detecting said sine wave signal of preselected frequency and generating a control signal corresponding to said detected sine wave signal for application to one of the projectors, and a plurality of first switch means each interconnected to one of said encoder-decoder circuit means which upon actuation causes its respective encoder-decoder circuit means to generate said sine wave signal of preselected frequency for application to said record amplifier and to said tape means as a cue signal and simultaneously applying a control signal to one of the projectors, each of said encoder-decoder circuit means including an amplifier circuit means having an input and output, a first RC feedback network connected between the output and input of said amplifier circuit means for cooperating with said amplifier circuit means to form an oscillator circuit for generating a sine wave signal of preselected frequency during the record mode, said first RC feedback network further cooperating with said amplifier circuit means for forming an active bandpass filter for detecting a sine wave signal of preselected frequency during the playback mode, a second RC feedback network connected between the output and input of said amplifier circuit means for cooperating with said amplifier circuit means and said first RC feedback network to control the band width of said active bandpass filter during said playback mode, said second RC feedback network being connected by one of said plurality of first switch means to ground potential during said record mode, switching circuit means connected to the output of said amplifier circuit means for generating a control signal for application to one of the projectors when said oscillator circuit generates a sine wave signal of preselected frequency during the record mode and when said active bandpass filter detects said sine wave signal of preselected frequency during the playback mode, and input switching means for applying ground potential to the input of said amplifier circuit means during the record mode.

19. The encoder-decoder circuit described in claim 18, including a resistive feedback network between the output and input of said amplifier circuit means for stabilizing all parameters of said amplifier circuit means during operation.

20. The encoder-decoder circuit described in claim 19, wherein said amplifier circuit means comprises a first transistor connected in an emitter follower configuration, a second transistor cascaded in series with said first transistor and connected in a common emitter configuration, and a third transistor cascaded in series with said second transistor and connected in an emitter follower configuration, the emitter lead of said third transistor connected to said switching circuit and to the inputs of said first, second and resistive feedback networks, the base lead of said first transistor being connected to the outputs of said first, second and resistive feedback networks.

21. The encoder-decoder circuit described in claim 20, wherein said switching circuit means comprises a silicon controlled rectifier the gate lead of which is connected to the emitter lead of said third transistor.

* * * * *